United States Patent [19]

Mitamura et al.

[11] Patent Number: 5,683,726
[45] Date of Patent: Nov. 4, 1997

[54] TIRE VULCANIZING SYSTEM

[75] Inventors: Hisashi Mitamura; Kotaro Ozaki; Kashiro Ureshino; Hiroyuki Takebayashi, all of Takasago, Japan

[73] Assignee: Kabushiki Kaisha Kobe Seiko Sho, Kobe, Japan

[21] Appl. No.: 444,577

[22] Filed: May 19, 1995

[30] Foreign Application Priority Data

| May 24, 1994 | [JP] | Japan | 6-135192 |
| May 26, 1994 | [JP] | Japan | 6-138301 |
| May 27, 1994 | [JP] | Japan | 6-137938 |

[51] Int. Cl.$^6$ .................. B29C 35/04; B29C 33/20
[52] U.S. Cl. .................. 425/34.1; 425/38; 425/47
[58] Field of Search .................. 425/34.1, 38, 47, 425/58.1

[56] References Cited

U.S. PATENT DOCUMENTS

| 4,025,251 | 5/1977 | Cantarutti | 425/47 |
| 4,338,069 | 7/1982 | Singh et al. | 425/38 |
| 4,390,334 | 6/1983 | Singh et al. | 425/28.1 |
| 4,669,964 | 6/1987 | Amano et al. | 425/34.1 |
| 4,725,212 | 2/1988 | Singh | 425/38 |
| 4,744,739 | 5/1988 | Singh | 425/34.1 |
| 4,921,412 | 5/1990 | Scantland et al. | 425/28.1 |
| 4,927,344 | 5/1990 | Amano et al. | 425/34.1 |
| 5,387,094 | 2/1995 | Ichikawa et al. | 425/47 |
| 5,447,424 | 9/1995 | Imler et al. | 425/34.1 |
| 5,492,464 | 2/1996 | Irie | 425/34.1 |

FOREIGN PATENT DOCUMENTS

| 0 589 050 | 3/1994 | European Pat. Off. |
| 2 330 529 | 6/1977 | France . |
| 2 627 723 | 9/1989 | France . |
| 59-12827 | 1/1984 | Japan . |
| 1-24050 | 5/1989 | Japan . |
| 4-332607 | 11/1992 | Japan . |
| 4-358808 | 12/1992 | Japan . |

*Primary Examiner*—James P. Mackey
*Attorney, Agent, or Firm*—Oblon, Spivak, McClelland, Maier & Neustadt, P.C.

[57] ABSTRACT

A tire vulcanizing system comprising (a) a tire vulcanizing press having a plurality of molding stations (b) a tire loader for loading tires onto the molding stations and (c) a tire unloader for unloading tires off of the molding stations, wherein the tire vulcanizing press comprises a fixed frame upon which the fixed molds of each molding station are mounted, a displaceable frame upon which the displaceable molds of each molding station are mounted, a tie-rod arranged between the molding stations and connecting the fixed frame to the displaceable frame, lifting cylinder for vertically displacing the displaceable frame along the tie-rod with respect to the fixed frame, half blocks for securing when necessary the displaceable frame to the tie-rod, thereby securing the displaceable frame to the fixed frame, and clamping means for forcibly clamping said displaceable molds to said fixed molds during tire vulcanization.

13 Claims, 14 Drawing Sheets

TIRE VULCANIZING SYSTEM

BACKGROUND OF THE INVENTION

Prior art tire vulcanizing systems, as disclosed in Japanese Patent Publication No. Sho 59-12827 and Japanese Patent Publication No. Hei 4-358808, include a tire vulcanizing press in which molding stations are supported on all sides by, a base frame secured to the floor, a plurality of side frames extending vertically from the base frame, and a top frame secured to the top of the side frames. With these tire vulcanizing presses several green tires can be vulcanized simultaneously.

A tire vulcanizing system usually also includes a tire loader for loading green tires onto the molding station(s) of the vulcanizing press. This tire loader comprises chuck means for grasping a green tire, chuck lifting means for vertically displacing the chuck means, and horizontal displacement means for horizontally displacing the chuck means. When the upper mold of a molding station has been raised, the green tire is loaded onto a clamping position of the molding station by vertically and horizontally displacing the chuck means of the tire unloader.

However, in the prior art vulcanizing systems, the arrangement of the side frames on either side of the molding stations of the vulcanizing press leads to the following problems.

(1) The side frames lead to an increase in the size of the vulcanizing press as a whole, thereby necessitating a relatively large space to locate the vulcanizing system.

(2) The existence of the side frames limits the manner in which tires can be loaded onto the molding station of the vulcanizing press, thereby limiting the design of the tire loader.

(3) The side frames obstruct the operation of changing the molds of the molding stations.

Furthermore, in the above-described prior art vulcanizing systems, the tire loader and tire vulcanizing press are provided independently, thereby making it necessary to co-ordinate the chuck lifting means of the tire loader to the vertical displacement of the upper mold of the tire vulcanizing press, which in turn necessitates the provision of detection and control means with the problem of a consequent increase in the manufacturing cost.

The above-described problems not only exist with the above described kind of direct-action tire vulcanizing presses, but also exist with dome-lock type presses (Japanese Patent Publication Hei 1-24050) having structure, corresponding to side frames, located around the molding station(s), and with column lock type tire vulcanizing presses (Japanese Patent Publication Hei 4-332607).

The present invention was made in light of the above-described problems existing with the prior art tire vulcanizing systems, and has as its objective the provision of a tire vulcanizing system including a tire vulcanizing press in which several molding stations may be supported without employing side frames to thereby solve the problems existing with the prior art vulcanizing presses.

In addition, this invention has as another objective the provision of a tire vulcanizing system in which there is no need to provide detection or control means for the operation of the tire loader to thereby reduce the cost of manufacture.

SUMMARY OF THE INVENTION

The tire vulcanizing system according to this invention comprises a tire vulcanizing press having a plurality of molding stations in which a green tire is molded between a displaceable mold and fixed mold clamped together, said vulcanizing press comprising: a fixed frame supporting said fixed molds of said molding stations; a displaceable frame supporting said displaceable molds of said molding stations; lifting means for vertically displacing said displaceable frame with respect to said fixed frame; connecting means arranged between said molding stations for connecting said fixed frame to said displaceable frame; lock means for securing said displaceable frame to said fixed frame via said connecting means; and clamping means for clamping said displaceable mold to said fixed mold.

Since the molding stations are thus supported by the connecting means arranged between the molding stations, the tire vulcanizing system according to this system is more compact compared to the conventional tire vulcanizing systems incorporating direct-action type, dome-lock type and column-lock type vulcanizing presses in which side frames are located on either side of the molding stations.

Furthermore, through the arrangement of the connecting means between the molding stations, the operation to replace a mold, as well as the operation of loading and unloading tires from the molding stations is facilitated. Furthermore, the absence of "side frames" reduces the limitations on the design of the loader and unloader.

It is preferred that the connecting means be provided directly between the plurality of molding stations in order to ensure excellent stability during clamping operations.

The tire vulcanizing system according to the present invention also comprises a tire loader for loading green tires from a position outside the tire vulcanizing press to a specified position between said fixed and displaceable molds, said tire loader comprising: chuck means for gasping a green tire; and horizontal displacement means mounted on said displaceable frame for displacing said chuck means in a horizontal direction.

By mounting the tire loader on the displaceable frame in this way, the tire loader can be displaced vertically together with the displaceable frame through the sole action of the lifting means, thereby eliminating the need for separate lifting means to vertically displace the tire loader, as well the need for detection means and control means used in the conventional tire vulcanizing systems to coordinate the vertical displacement of the tire loader with the vertical displacement of the displaceable frame. The number of component parts can thus be reduced with a consequent reduction in cost and increase in compactness.

In one embodiment of the present invention, the tire loader is mounted on the displaceable frame in such a way that it can be vertically displaced with respect thereto. By doing so, it is possible to raise the tire loader with respect to the displaceable frame to facilitate the operation of the replacement of the molds, and to adjust the lowest position of the chuck means in accordance with any change in position of a green tire waiting to be conveyed by the tire loader to a molding station.

It is to be noted that the feature of simplifying both the tire loading operation and the structure of the tire loader itself, by adopting a system in which the vertical displacement of the tire loader is effected by the lifting mechanism used to vertically displace the upper mold is not limited to application in tire vulcanizing systems of the type described above, but can also be applied to other kinds of tire vulcanizing systems.

The tire vulcanizing system according to the present invention also comprises a loader capable of performing the following three operations: (i) the unloading of a tire from one of said plurality of molding stations, (ii) conveying a tire to a post-cure inflator having secured tire supports, and (iii) conveying a tire from a post-cure inflator to conveyor means. By using such a tire unloader capable of performing all the above three operations, the number of components is reduced thereby facilitating any maintenance operation.

It is also preferred that separate clamping means be provided for each molding station to ensure that the clamping force applied to the molds of each molding station is uniform even if there exists a difference in the mold height between the mold stations.

It is also preferred that the clamping means comprise a mold clamping mechanism for forcibly pressing said displaceable mold towards said fixed mold towards the other; and an adjustment mechanism for adjusting the vertical position of said displaceable mold in accordance with any change in the mold height dimension accompanying a change of mold. Thus, in the case that the existing mold is replaced for a mold of different height dimensions, the vertical position of the displaceable mold can be adjusted as necessary in accordance with this change in height dimensions of the mold.

It is also preferred that the mold clamping mechanism and adjustment mechanism of the clamping means are combined into a single unit. In this way parts common to both mechanisms are not unnecessarily replicated, and it is possible to thereby reduce the number of components with a consequent reduction in cost, and to improve the system with respect to maintenance.

Also, it is preferred that the clamping means have a hollow core, such that a splitting shaft 41 can be inserted into this hollow core when required.

DETAILED DESCRIPTION OF THE EMBODIMENTS

A first embodiment of the present invention shall be described with reference to FIGS. 1 to 10.

Figure 1:
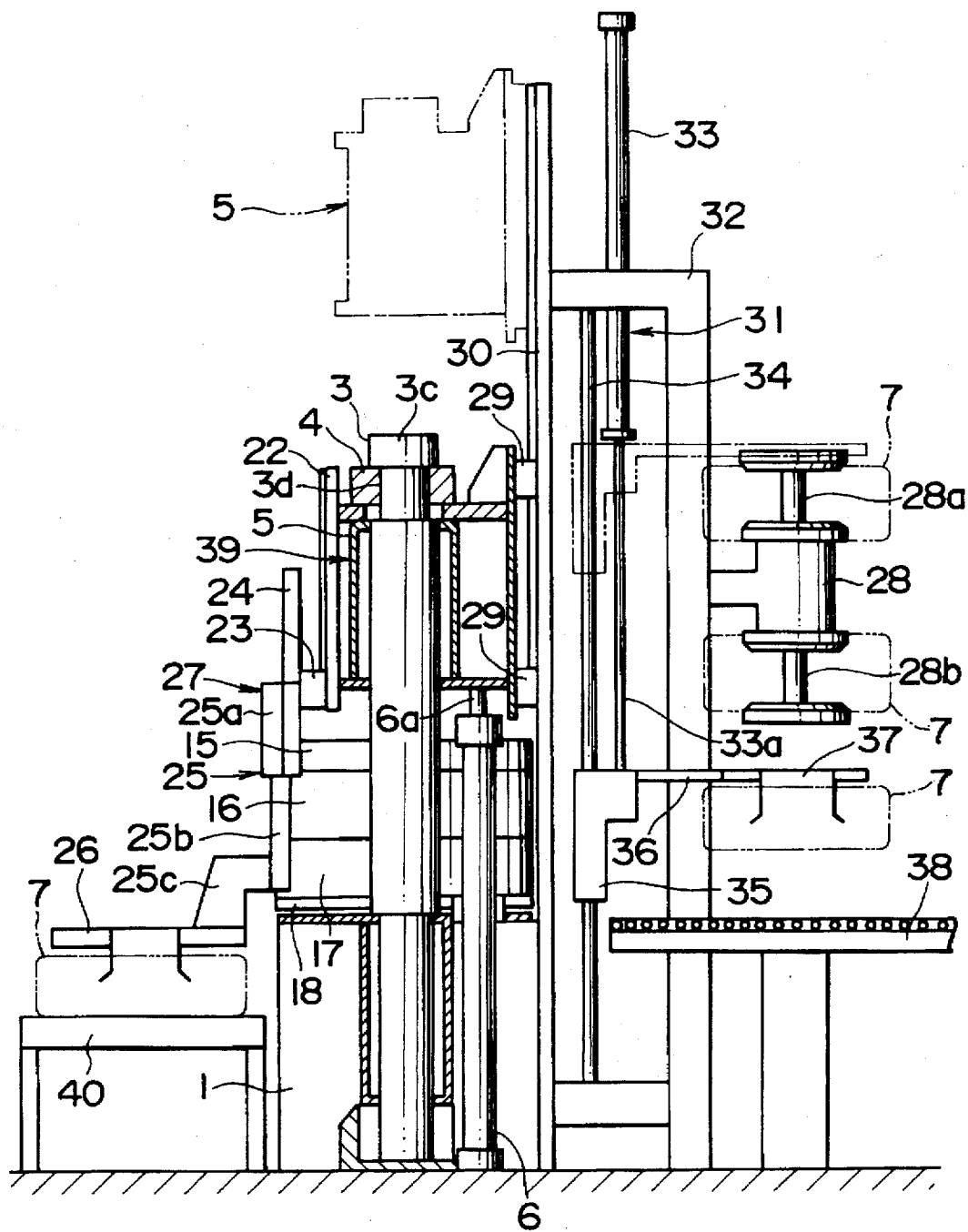
FIG. 1 is a side-view of a tire vulcanizing system according to an embodiment of the present invention.

As shown in FIG. 1, the tire vulcanizing device according to this first embodiment comprises a tire vulcanizing press for molding a green tire 7, a tire loader 27 for loading green tires into a molding station of the tire vulcanizing press, and an unloader 31 for unloading molded tires out of a molding station of the tire vulcanizing press.

Figure 2:
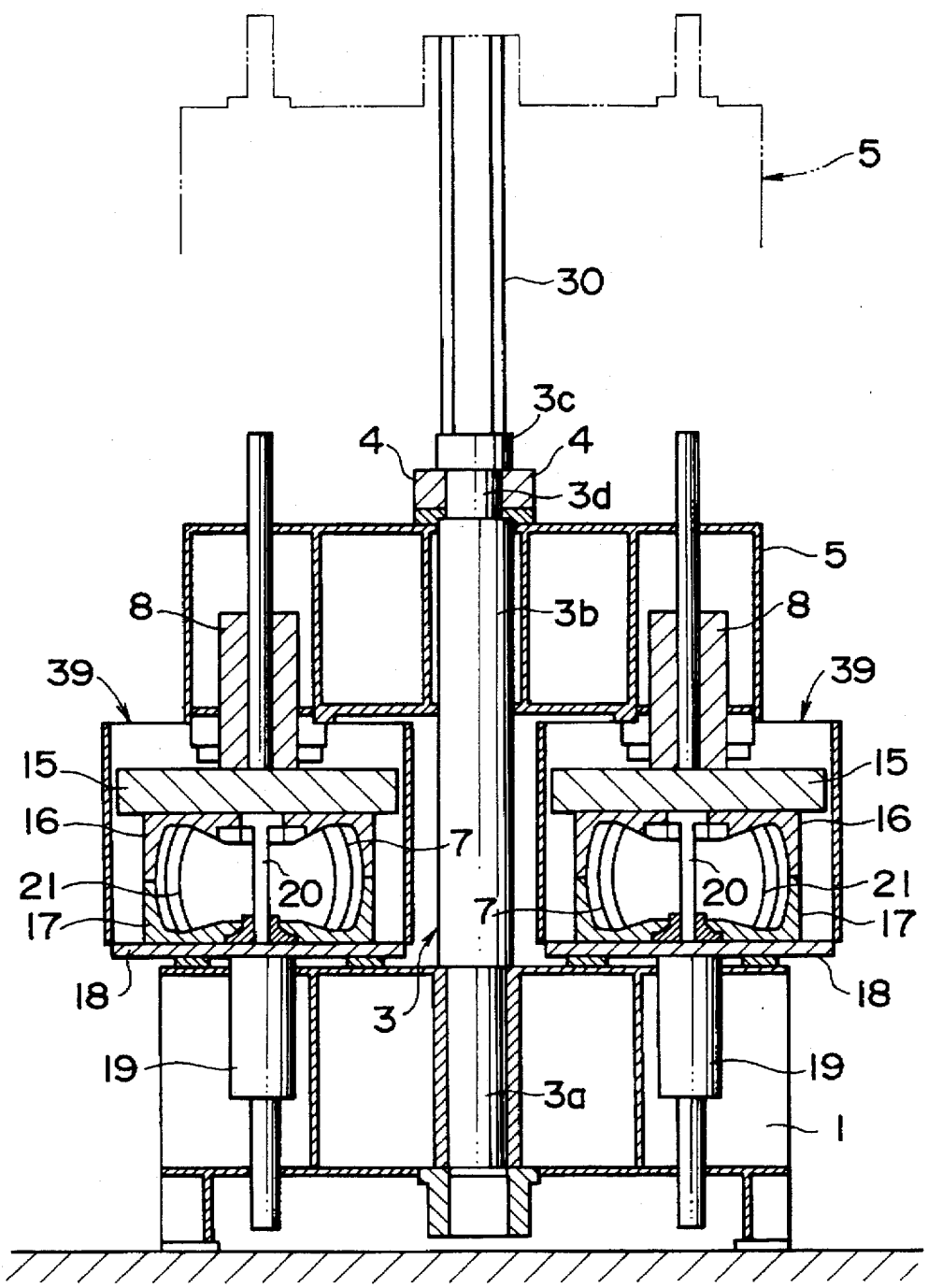
FIG. 2 is a front-view of a tire vulcanizing system according to an embodiment of the present invention.

The tire vulcanizing press which is shown in FIG. 2, has a base frame 1 (fixed frame) secured to the floor. A tie-rod 3 is mounted vertically in the center of the base frame, and the top end of the the tie-rod is fitted through a hole formed in the center of top frame 5 (displaceable frame) to move freely therein.

The tie-rod 3 is made up of a bottom section 3a secured in the center of the base frame, a middle section 3b extending vertically upwards from the base frame 1, and a top section 3c. It also comprises a grooved section 3d situated between the top section 3c and the middle section 3b, whose diameter is smaller than the diameter of the middle and top sections.

Figure 3A:
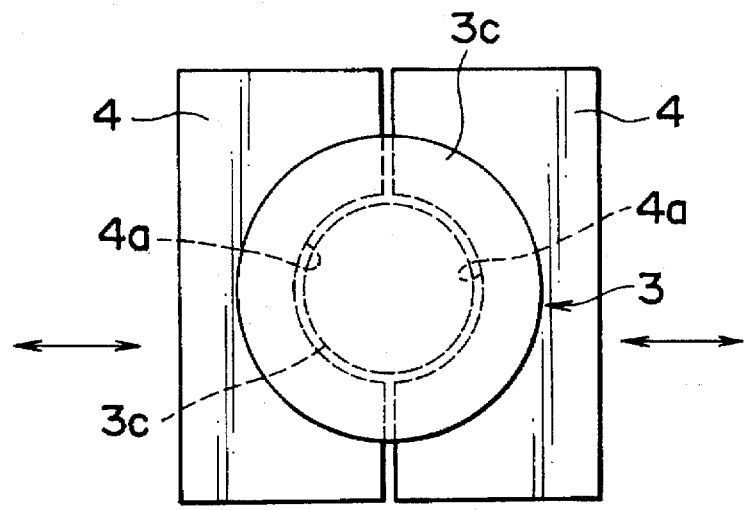
FIG. 3(a) is a front view and FIG. 3(b) a side view of the half-blocks used in a tire vulcanizing system according to an embodiment of the present invention.
Figure 3B:
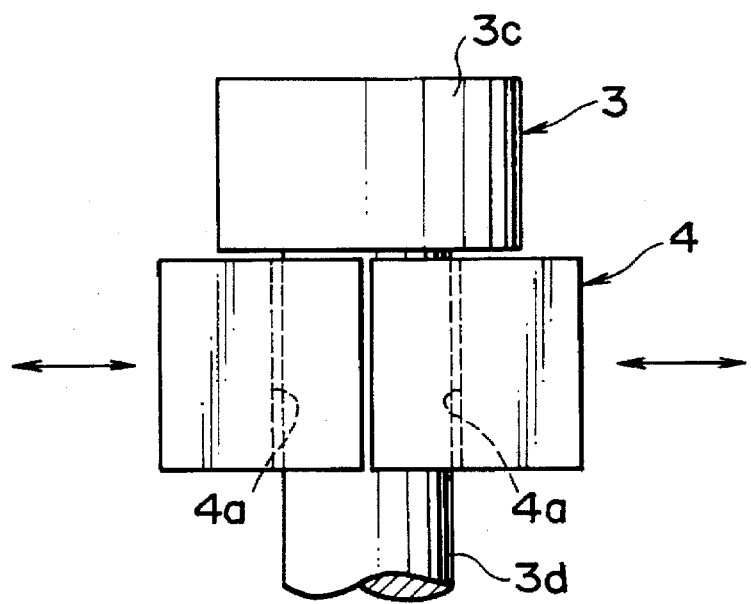

A pair of half blocks (4) are mounted around this grooved section 3d. These half blocks (4) are displaced in a direction parallel to the top surface of the top frame 5 by block displacing means not shown in the diagram. This block displacing means "locks" the half-blocks around the grooved section 3d by moving the half blocks towards each other, and "unlocks" the half blocks from the grooved section by moving the blocks away from each other. As shown in FIG. 3(a) and 3(b) the half blocks have concaved inner surfaces, such that when the blocks are moved together, they form a hole of a diameter slightly larger than that of the grooved section 3d. In the "locked" state, the top and bottom surfaces of the half-blocks respectively contact the lower surface of top-section 3c and the upper surface of top-frame 5, to thereby secure the top frame to the tie-rod 3 and hence to base-frame 1.

A pair of molding stations 39 are mounted on the lower surface of the top frame 5, in such a way that tie-rod 3 is positioned centrally between the two. Each of these molding stations 39 includes a clamping mechanism 8 which itself includes a mold clamping mechanism, and a mold height adjustment mechanism. An upper platen 15 having a heat source built therein is mounted on the bottom of clamping mechanism 8.

Figure 4:
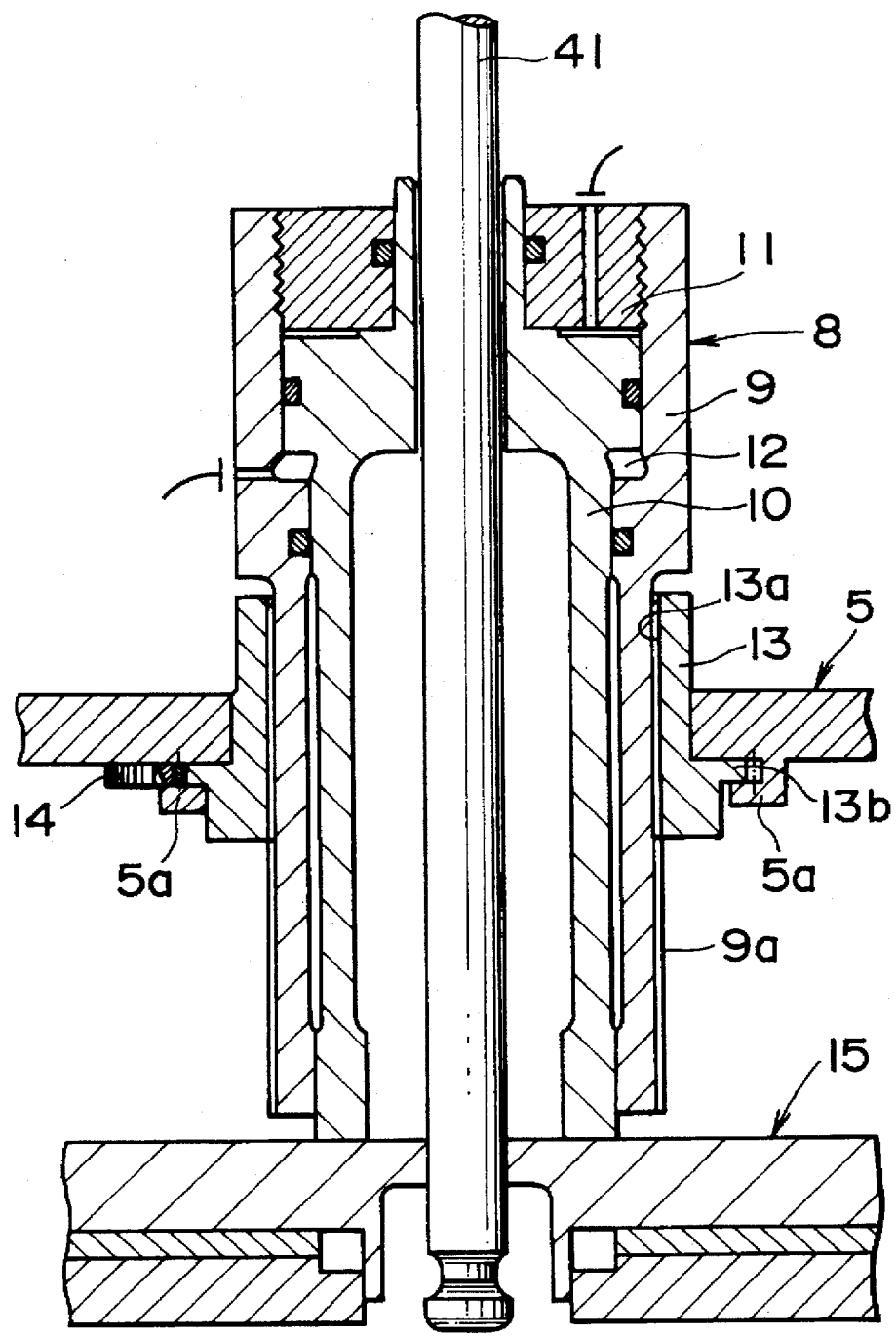
FIG. 4 is a cross-sectional view of a clamping mechanism employed in a tire vulcanizing system according to an embodiment of the present invention.

As shown in FIG. 4, the clamping mechanism 8 comprises a hollow cylinder 9 secured for non-rotation, a hollow rod 10 fluid-tightly fitted into this cylinder for sliding movement inside the cylinder, and a splitting shaft 41 arranged to pass through the inside of the rod 10.

Pressurized hydraulic fluid supplied from supply means (not shown) is directed to either of a first space 11 or a second space 12 formed between the cylinder 9 and the rod 10, in order to move the rod relative to the cylinder. If hydraulic fluid is supplied to second space 11, the rod 10 is pushed out of cylinder 9 and the upper platen 15 is pressed downwards towards base-frame 1, thereby clamping the upper mold 16 to the lower mold 17 (via top frame 5, tie-rod 3 and base frame 1)with a specified clamping force. On the other hand, if hydraulic fluid is subsequently supplied to first space 12, the rod 10 is withdrawn back into cylinder 9, and the clamping action is released.

The height adjustment mechanism by which the clamping mechanism is supported on top frame 5, is integrated into clamping mechanism 8 itself. In detail, it comprises a male screw 9a formed on the outer surface of cylinder 9, and a nut 13 mounted for free rotation in the hole formed in top-frame 5 and through which cylinder 9 passes. This nut 13 has a female screw 13a formed on the inner surface thereof, and this female screw 13a mates with the male screw 9a formed on the outer circumferential surface of cylinder 9. A section of the outer surface of the nut 13 has a gear 13b formed thereon, and this gear 13b engages a pinion 14 which is axially mounted for rotation on top frame 5. The gear 13b, is supported by support component 5a of top frame 5, such that nut 13 cannot move vertically with respect to top frame 5. In order that the cylinder 9 is displaced vertically when nut 13 is rotated, the cylinder 9 is prevented from rotation using a detent.

Provided nut 13 is not rotated, clamping mechanism is secured vertically with respect to top frame 5 through the meshing of male screw 9a with female screw 13a. The cylinder 9 can be displaced vertically with respect to top frame 5 and to a desired extent by rotating the pinion 14, through rotation drive means (not shown), by a number of rotations corresponding to the desired degree of displacement.

As shown in FIG. 2, the upper mold 16 is mounted on the lower side of upper platen 15, and this upper mold 16 is heated during vulcanizing operation by the heat source built into upper platen 15. The lower mold 17 is arranged below upper mold 16, and green tires are inserted within the cavity formed between the lower and upper molds when clamped together.

The lower mold 17 is secured to base frame 1 via lower platen 18 which also has a built in heat source, and the lifting rod 20 of a center mechanism 19 is fitted in a hole formed in the center of lower mold 17. Lifting rod 20 supports a bladder 21 which is inflated to press radially against the inner surface of a green tire inserted in the cavity between the lower and upper molds.

As shown in FIG. 1, top frame 5 which supports upper mold 16 through clamping mechanism 8 and upper platen 15, is supported by frame lifting cylinder 6 which is secured to base frame 1. This frame lifting cylinder 6 is arranged to run parallel to tie-rod 3, and the top end of cylinder rod 6a is secured to the lower surface of top frame 5.

On the back face of top frame 5 are mounted frame guide components 29. These frame guide components 29 are engaged, for vertical displacement with respect thereto, with frame guide rails 30 mounted vertically in parallel with the axis of tie-rod 3. Thus, the top frame 5 can be raised, through the extension of cylinder rod 6a of cylinder 6, up along frame guide rails 30 to a top position removed from tie-rod 3 (as shown by the double-dotted line in FIG. 2), and can subsequently be lowered along frame guide rails 30 back to a bottom position where it is once again fitted onto tie-rod 3.

On the front face of top frame 5 (left hand face in the diagram) is mounted the tire loader 27 for conveying pre-vulcanized green tires loaded onto a trolley to a position between the upper and lower molds 16, 17. This tire loader 27 is designed to be displaced vertically with top frame 5, through the action of frame lifting cylinder 6, and comprises, a loader guide rail 22 mounted on the front face of top frame 5, loader guide components 23 engaged for vertical displacement with loader guide rail 22, rotation means 25 mounted on loader guide components 23, and a loader chuck 26 mounted on rotation means 25.

The loader guide rail 22 is mounted to be parallel with the axis of tie-rod 3. The loader guide rail 22 and loader guide components 23 are used (i) to adjust the height of loader chuck 26 to a height corresponding to the vertical position of a green tire 7 positioned on the trolley 40, and (ii) to position the chuck in a top position in times of mold replacement, to thereby facilitate the replacement operation. The detection of the vertical position of a green tire 7 positioned on the trolley 40 is effected by a limit switch mounted on the lower side of the loader chuck 26. The height of the loader chuck is controlled through a detection signal generated when the limit switch contacts the green tire 7. The rotation means 25 is attached to loader guide components 23 via support component 24, and comprises rotator 25a, shaft 25b attached to rotator 25a to extend along the axis of rotation of rotator 25a, and arm 25c mounted on the bottom of shaft 25b and extending in a radial direction away from the shaft 25b.

Figure 5:
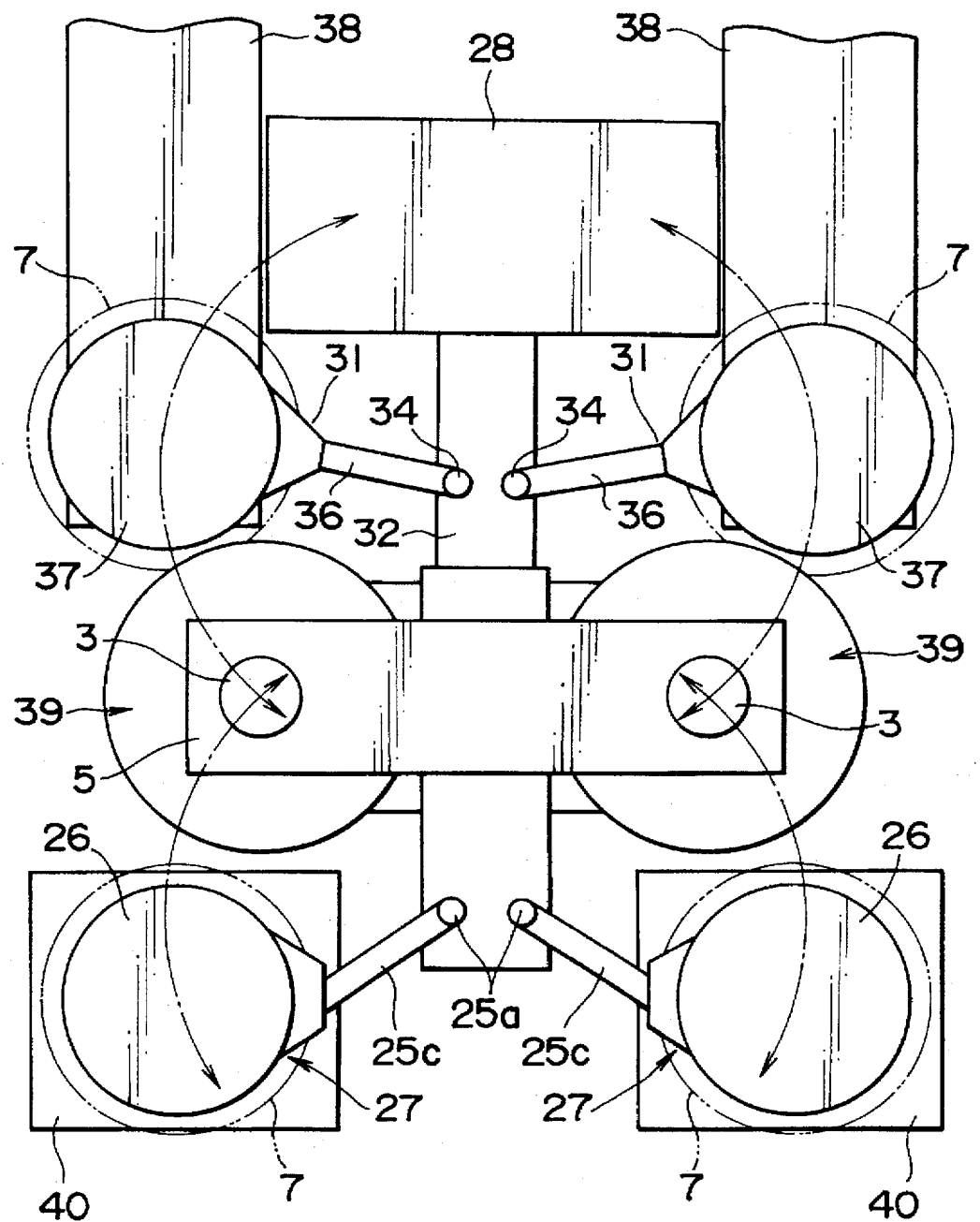
FIG. 5 is diagram showing the operation of a loader and unloader used in a tire vulcanizing system according to an embodiment of the present invention.

The center axis of shaft 25b is mounted in a direction parallel to the center axis of tie-rod 3, and the loader chuck capable of gripping a green tire is mounted at the end of arm 25c. Then, as shown in FIG. 5, a pair of left and right tire loaders 27 having the above-described construction are mounted on the top frame 5 for respectively serving left and right molding stations. Through the rotating action of rotator 25a, the loader chuck is rotated via arm 25c and shaft 25b in a horizontal plane between a position corresponding to a green tire mounted on trolley 40 and a position between upper and lower molds 16, 17.

In addition, as shown in FIG. 1 and FIG. 5, a pair of right and left unloaders 31 for respectively serving left and right molding stations 39 are located towards the back face (right hand face in the diagram) of top frame 5. These unloaders 31 are supported by a vertical frame 32 secured to the floor and frame guide rail 30.

As shown in FIG. 1, the unloader 31 comprises (i) unloader lifting cylinder 33 and guide shaft 34, both secured to vertical frame 32, such that their axes run parallel to the tie-rod 3, (ii) unloader guide component 35 slideably fitted on to guide shaft 34 and attached to the end of cylinder rod 33a of unloader lifting cylinder 33, (iii) rotatable arms 36 mounted on either side of unloader guide component and (iv) an unloader chuck 37 mounted on the end of each rotatable arm 36. The vertical frame 32 also supports post-cure inflator 28. This post-cure inflator 28 comprises an upper tire support 28a and a lower tire support 28b arranged securely one above the other. A tire is held by one of these upper and lower tire supports 28a, 28b, at which time compressed air is supplied to the inside of the tire to inflate the tire.

The unloader guide component 35 is lowered and raised along guide shaft 34 by respectively extending and contracting the cylinder rod 33 of unloader lifting cylinder 33. The top position of the unloader guide component 35 is set such that the green tire gripped by the unloader chuck 37 can be raised above the upper tire support 28a. The lower position of the unloader guide component 35 is set such that a green tire gripped by the unloader chuck 37 is positioned above a tire transporter 38 used for transporting finished tires after inflating-cooling.

As shown in FIG. 5, this tire transporter 38 is arranged along the path of rotatable arm 36 between the post-cure inflator 28 and the molding station 39. The operation of the unloader 31 comprises three stages: (a) unloading a tire from the molding station 39, (b) conveying a tire to the post-cure inflator 28, and (c) conveying a tire onto the tire transporter 38 after inflating-cooling.

Next, the operation of the tire loader 27 shall be described.

As shown in FIG. 1, the vertical position of the loader guide component 23 is adjusted such that the lowest position of the loader chuck 26 matches an optimum vertical position with respect to the vertical position of a tire on the tire trolley 40. When the adjustment is complete and the loader guide component 23 has been secured to the loader guide rail 22, the loader chuck 26 is rotated through rotation means 25 to a position over the tire trolley 40. Then, with the half blocks 4 maintained in a separated condition, the top frame 5 is lowered using frame lifting cylinder 6, by which action the loader chuck 26 is lowered with top frame 5 to a position where it is inserted inside a tire positioned on the tire trolley 40. The loader chuck 26 grasps the tire and is raised with top frame 5 through the action of frame lifting cylinder 6. The upper mold 16 is also thus consequently raised with top frame 5 to a position above the upper mold 17. The raising operation using frame lifting cylinder 6 stops when the green tire grasped by the loader chuck 26 reaches a specified vertical position higher than the lower mold 17.

Next, the loader chuck is rotated in a horizontal plane using rotation means 25, such that the green tire 7 is positioned between upper and lower molds 16, 17. Then the loader chuck 26 is lowered together with top frame 5 using frame lifting cylinder 6 such that the green tire grasped by the loader chuck 26 is lowered into a clamping position on the lower mold.

Then, the loader chuck is withdrawn from the molding station 39 through the rotation of rotation means 25 and the vertical displacement of top frame 5. The top frame 5 is then lowered to its lowest position by frame lifting cylinder 6, after which the half-blocks 4 are displaced towards each other such that they fit around the grooved section 3d of tie-rod 3. Through this operation the top frame 5 is locked to tie rod 3, to effectively secure top frame 5 to base frame 1 via tie-rod 3.

Then, with reference to FIG. 4, hydraulic fluid is directed to the second space 11 of clamping mechanism 8 to extend rod 10, and as shown in FIG. 2, the upper mold 16 is thereby pressed down onto lower mold 17 to clamp the upper and lower molds together. Thereafter, the upper and lower molds are heated and the inner surface of the green tire located in the cavity between the upper and lower molds is forced radially outwards by the action of bladder 21. The green tire is thereby vulcanized.

After the completion of the vulcanization, the half-blocks 4 are once again separated and the top-frame 5 is raised by the action of frame lifting cylinder 6, whereby the upper mold 16 is separated from the upper mold 17. The unloader guide component 35 is then raised by unloader lifting cylinder 33 to an intermediate position corresponding to a position between the upper and lower molds, and the unloader chuck 37 is rotated to a position directly above lower mold 17.

After grasping the tire, the loader chuck 37 then removes tire 7 from lower mold 17, and is rotated to an intermediate position between the post-cure inflator 28 and the molding station 39. Then the unloader chuck 37 is raised by unloader lifting cylinder to a height corresponding to the position of the upper or lower tire support 28a, 28b of post-cure inflator 28. The unloader chuck 37 is then rotated towards the post-cure inflator, and the tire mounted on the upper or lower tire support of the post-cure inflator.

As shown in FIG. 5, when the inflating-cooling operation of the post-cure inflator is complete, the unloader chuck 37 gasping the tire 7 is rotated to a position along the path of the rotatable arm 36 and in between the post-cure inflator 28 and the molding station 39, whereafter it is lowered to load tire 7 onto tire transporter 38.

Next, in the case that a green tire of a different type is to be vulcanized, it is necessary to change the upper and lower molds 16, 17. If the new mold is a mold of different height dimension from the previous mold, then it becomes necessary to adjust the vertical position of the mold in accordance with the change in height dimension by rotating pinion 14.

As shown in FIG. 4, the female screw of 13a of nut 13 mates with the male screw 9a of cylinder 9, and cylinder 9 is prevented from rotating by a detent (not shown). Thus, if the nut 13 is rotated by rotating pinion 14, the cylinder 9 is displaced vertically and the vertical position of the clamping mechanism 8 can be adjusted as necessary in accordance with the height dimension of the new mold.

Then, a pre-vulcanized green tire 7 to be vulcanized using the new mold is delivered to molding station 39, and is subject to vulcanization, in the same way as described above, between upper and lower molds clamped together with a specified clamping force.

In the above-described embodiment, as shown in FIGS. 1 and 2, the base frame is adopted as the secured frame and the top frame is arranged to be displaceable relative to this base frame. However, it is also possible to adopt the top frame as the secured frame, and the base frame as the displaceable frame. Furthermore, the tie-rod 3 can be fixed to either one of the secured frame or the displaceable frame, and it is also possible to arrange for the displaceable frame to be displaceable in a left-right direction.

In other words, the vulcanizing press can be a vertical clamping type as in the embodiment described above, or it can be a horizontal clamping type.

If the tie-rod 3 is secured to the secured frame, then a stabilized clamping condition can be achieved. Also, if the tie-rod 3 is secured to the displaceable frame and the lock means is provided on the secured frame, then since it is not necessary to employ pipes etc. for operating the lock means which can move in tandem with the displaceable frame, the mechanism can be simplified.

Furthermore, in the above-described embodiment, the molding stations 39 (i.e. the clamping mechanisms etc.) were arranged such the tie-rod 3 was located exactly centrally between them. However, the tie-rod can also be positioned off-set from the exact center position provided that it is located somewhere in between the pair of molding stations.

Also, the present invention is not limited to twin molding station presses such as the above-described embodiment, and can also be applied to presses having three or more molding stations.

It is also possible to use a pin-insert or bayonet type locking system instead of the half-blocks employed in the above-described embodiment to effect the securing of the tie-rod to the displaceable frame.

Furthermore, it also possible to use a split tie-rod having two separate sections connected to the secured frame and displaceable frame respectively, and wherein the displaceable frame is secured to the base frame by "locking" together the ends of the two separate sections.

In the above-described embodiment, the horizontal displacement of the loader chuck is effected by a rotation movement using rotation means 25. However, this horizontal displacement could also be effected by a extension/contraction movement etc.

In the above-described embodiment, clamping mechanism 8 is hollow and has a splitting shaft 41 running vertically through the middle thereof to contact upper mold 16. However, it is also possible to locate the splitting shaft 41 in center mechanism 19 such that it runs vertically through the center thereof to contact lower mold 17. It is also possible to do away with the splitting shaft 41 completely and use a solid clamping mechanism.

Figure 6:
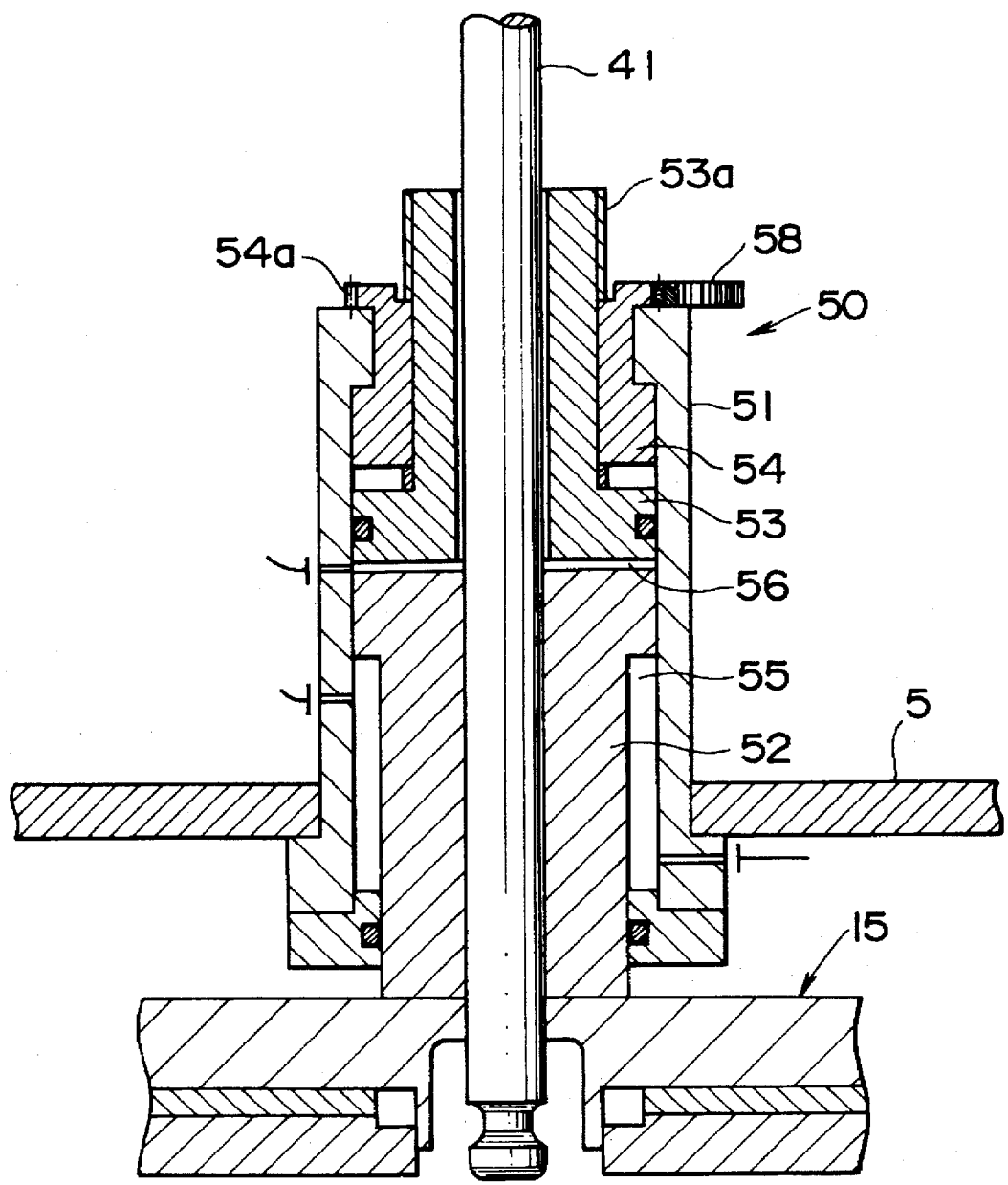
FIG. 6 is a cross-sectional view of a clamping mechanism.
Figure 7:
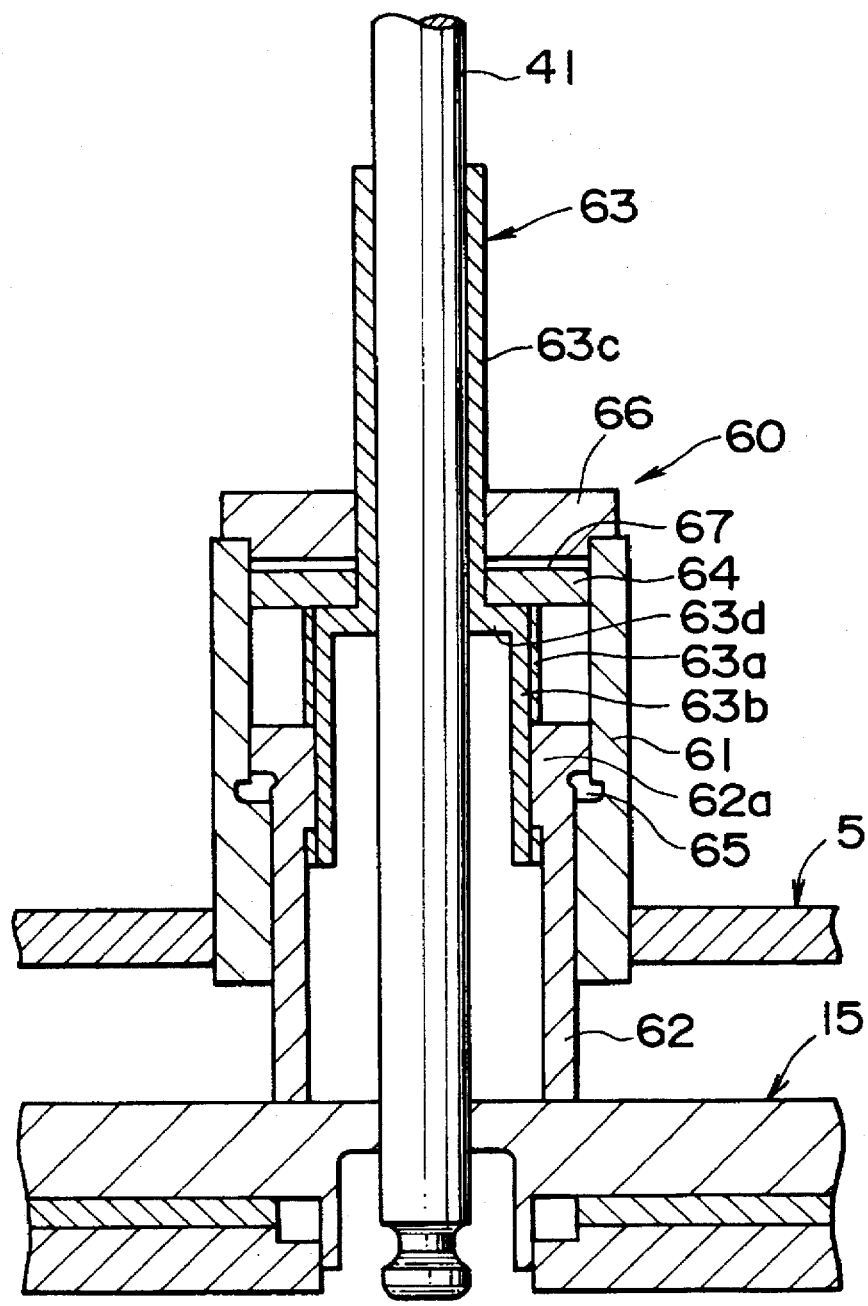
FIG. 7 is a cross-sectional view of a clamping mechanism.
Figure 8:
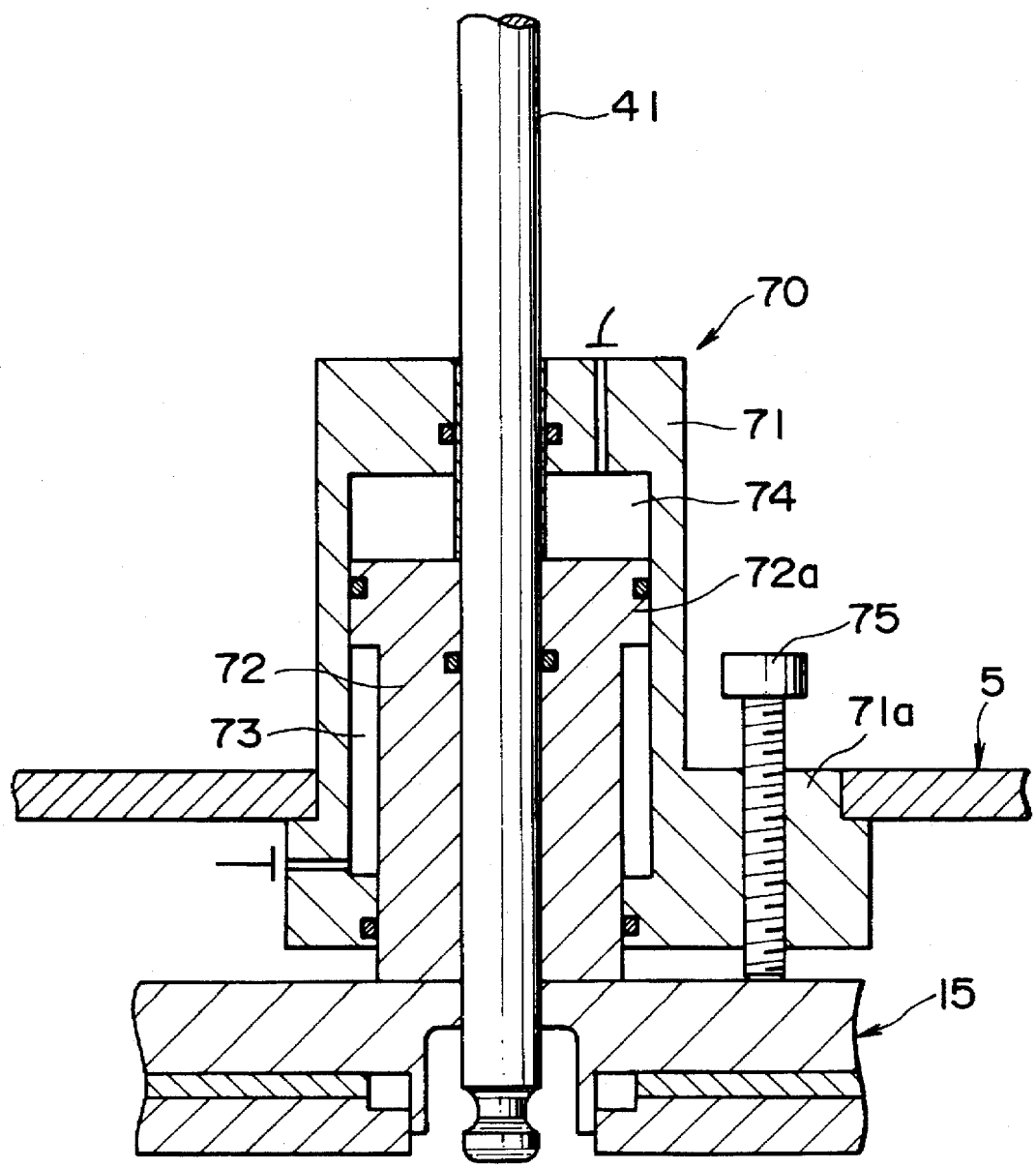
FIG. 8 is a cross-sectional view of a clamping mechanism.
Figure 9:
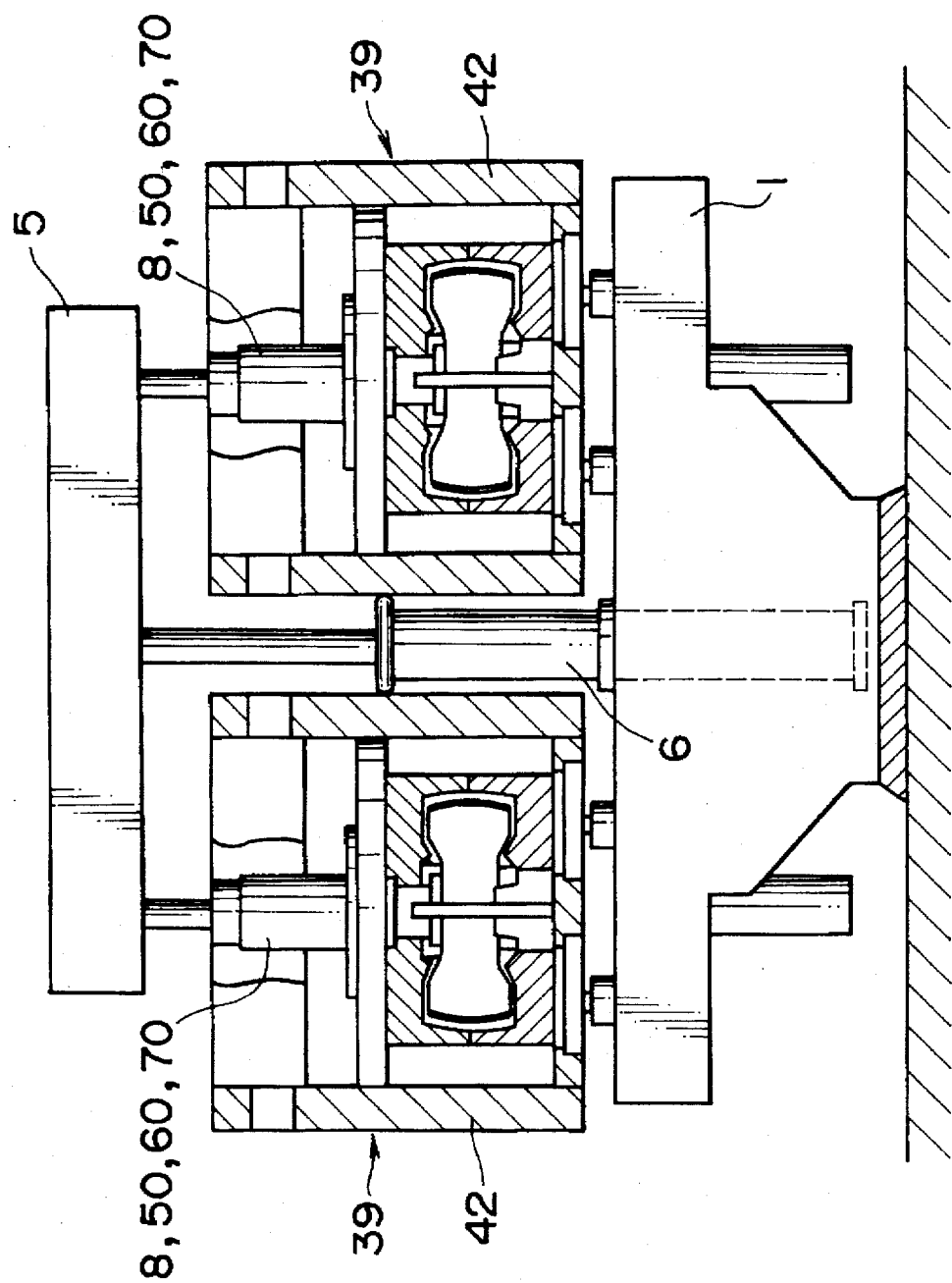
FIG. 9 is a front-view of a tire vulcanizing press in the clamped state.

Furthermore, it is also possible to use clamping mechanisms of the types shown in FIGS. 6–8.

The clamping mechanism 50 shown in FIG. 6, comprises a hollow cylinder 51 fixed to top-frame 5. Inside this cylinder 51 is arranged a hollow rod 52 having upper platen 15 connected thereto. This hollow rod 52 and hollow cylinder 51 create a first space 55 therebetween. Above the hollow rod 52, fitted inside the cylinder 51, is provided an adjustment screw 53 through the middle of which runs splitting shaft 41, and a nut 54 which mates with the adjustment screw 53. The adjustment screw 53 is secured to cylinder 51 for vertical displacement with respect thereto by nut 54.

The above-described adjustment screw 53 forms together with hollow rod 52 a second space 56 therebetween. These first and second spaces 55, 56 are designed to have hydraulic fluid directed thereto from a hydraulic fluid supply means (not shown). If hydraulic fluid is supplied to the second space 56, the hollow rod 52 is pushed out of the cylinder 51 and the platen is pressed downwards. If subsequently hydraulic fluid is then supplied to the first space 55, the hollow rod 52 is withdrawn back into cylinder 51 and the force acting on the platen 15 is released.

A male screw 53a is formed on the circumferential surface of the upper narrow diameter portion of the adjustment screw 53, and nut 54 mates with this male screw 53a. The lower section of nut 54 is fitted for free rotation into cylinder 51, and the upper portion of nut 54 holds the upper portion of cylinder 51. On the the circumferential surface of the uppermost portion of the nut 54 is formed a gear, and this gear engages with a pinion 58. If pinion 58 is used to rotate the nut 54 at the top end of cylinder 51, the adjustment screw 53 is displaced vertically.

When the vertical position of the mold height is to be adjusted, the nut 54 is made to rotate by rotating pinion 58. Nut 54 is mated with the male screw 53a of adjustment screw 53, and adjustment screw 53 is secured such that it cannot rotate. Accordingly, if nut 54 rotates, then the adjustment screw 53 is displaced in a vertical direction. Hollow rod 52 which contacts the bottom face of adjustment screw 53 is displaced vertically together with adjustment screw 53, and therefore the vertical position of the clamping mechanism 8 can be adjusted in accordance with any change in the height dimensions of a new mold.

Clamping mechanism 60 shown in FIG. 7 comprises a hollow cylinder 61 secured to top frame 5. A hollow rod 62 having the lower platen 15 connected to the bottom thereof is fluid-tightly fitted inside hollow cylinder 61. This hollow cylinder 61 and hollow rod 62 form a first space 65 therebetween.

On the inner circumferential surface of the hollow rod 62 is formed a female screw 62a comprising the mold height adjustment means. The male screw 63a of hollow adjustment screw 63, which has splitting shaft 41 running vertically through the center thereof, mates with male screw 62a. Hollow rod 62 is displaceable vertically with respect to adjustment screw 63 by rotating either adjustment screw 63 or hollow rod 62. In the case that hollow rod 62 is rotated, it is required that a construction be adopted in which only hollow rod 62 rotates and platen 15 does not rotate, such that hollow rod 62 be rotatable with respect to platen 15.

The above described adjustment screw 63 is comprised of (i) a large diameter section 63b upon the circumferential surface of which a male screw 63a is formed, (ii) a narrow diameter section 63c extending vertically upwards parallel to splitting shaft 41, and (iii) a shoulder section 63d joining the large diameter section 63b and narrow diameter section 63c. A piston component 64 contacts the top face of shoulder section 63d, and the outer circumferential surface of this piston component 64 is fluid-tightly fitted to the inner circumferential surface of the hollow cylinder 61. Above piston component 64 is provided a closing component 66 which closes off the space between the narrow diameter section 63c of adjustment screw and the upper rim of hollow cylinder 61. This closing component 66 together with piston component 64 form a second space 67 therebetween.

First space 65 and second space 67 are designed to have hydraulic fluid supplied thereto from a supply means (not shown). If hydraulic fluid is directed to second space 67, then piston component 64 is forced downwards against the shoulder section 63d of the adjustment screw 63, and in turn hollow rod 62 which mates with the male screw 63a of adjustment screw is pressed downwards thereby causing platen 15 to be pushed downwards with a certain force. If hydraulic fluid is subsequently supplied to first space 65, then hollow rod 62 is withdrawn into cylinder 61 and the pressing force acting downwards on the platen 15 is released.

In order to adjust the vertical position of the mold, the adjustment screw 63 or the hollow rod 62 is rotated. The male screw 63a of adjustment screw 63 is mated with the female screw of hollow rod 62a, and therefore hollow rod 62 is displaced vertically relative to adjustment screw 63 if adjustment screw 63 is rotated. Also the upper surface of bent section 63d of adjustment screw contacts piston component 64 whereby the upper limit of the position of adjustment screw 63 is fixed constant by component 64. Accordingly, if adjustment screw 63 or hollow rod 62 are made to rotate, the hollow rod 62 is displaced vertically with respect to top frame 5 and as a result it is possible to adjust the vertical position of hollow rod 62 in accordance with any changes in the height dimension of a new mold fitted to the upper platen.

The clamping mechanism 70 shown in FIG. 8 comprises a hollow cylinder 71 secured to the top frame 5. A hollow rod 72, having platen 15 fixed to the bottom thereof, is fitted inside this hollow cylinder. Splitting shaft 41 runs vertically through this hollow rod 72. The circumferential surface of the upper large diameter section 72a of the hollow rod fluid-tightly fits the inner circumferential surface of the cylinder 71. Cylinder 71 and hollow rod 72 together create a fast space 73 and a second space 74 respectively located below and above the large diameter section 72a.

These first and second spaces 73, 74 are designed to have hydraulic fluid supplied thereto by a hydraulic fluid supply means (not shown). If hydraulic fluid is supplied to the second space 74, a force acts to push hollow rod 72 out of the cylinder 71 and platen 15 is forced downwards with a certain force. If hydraulic fluid is then subsequently directed to first space 73, a force acts to push the hollow rod 72 upwards into the cylinder 71 and the downwards pressing force acting on the platen is released.

Furthermore, an abutment 71a extends radially from the lower portion of the cylinder 71. A bolt 75 is screw-fitted into this abutment 71a, such that its axis is parallel to the axis of splitting shaft 41. The tip of the bolt 75 protruding from the down-facing surface of the protruding section 71a contacts the top of platen 15. By setting the topmost position of the platen 15 by adjusting the position of the bolt 75, the vertical position of the hollow rod 72 with respect to cylinder 71 can be set as detailed below. If bolt 75 is rotated, the bolt 75 is displaced vertically. By vertically displacing the bolt 75 the upper limit of the platen 15 can be set, and thus the vertical position of the hollow rod 72 with respect to the cylinder 71, can be adjusted in accordance with any change in the height dimensions of a new mold fitted.

The above-described clamping means (8, 50, 60, 70) were all described in terms of their application to a tire vulcanizing press of the kind shown in FIG. 1. However, these clamping means are not limited to their application in such a tire vulcanizing press but can also be used in other types of vulcanizing presses, such as the tire vulcanizing press shown in FIG. 9 which comprises a top frame 5 arranged to be supported and vertically displaced by a frame lifting cylinder 6, and having lock mechanisms 42 provided for each molding station 39. It is also possible to use the above-described clamping mechanisms in other kinds of vulcanizing presses such as column-lock type or dome-lock type vulcanizing presses.

Figure 10:
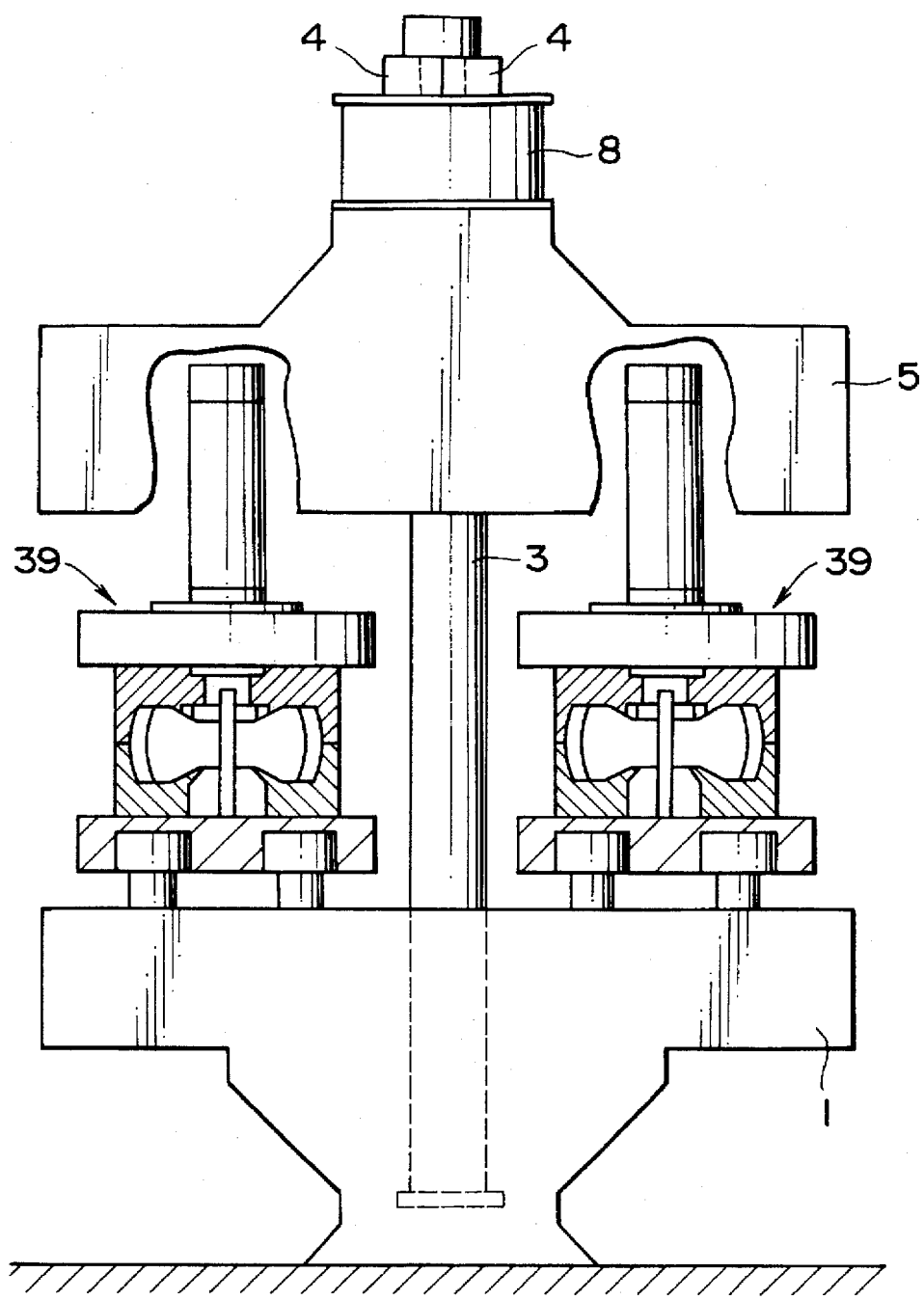
FIG. 10 is a front-view of a tire vulcanizing press according to another embodiment of the present invention in which the mold clamping mechanism is provided on the tie-rod.

Also in the above-described embodiment, a separate clamping mechanism (8, 50, 60, 70) was provided for each molding station. However, it is also within the scope of this invention to fit a single clamping mechanism inbetween the half blocks 4 and the top frame 5 as shown in FIG. 10. Then, the upper and lower molds are forcibly clamped together by using clamping mechanism to apply a downwards force to top-frame 5. In this way the clamping of all the molding stations can be effected by a single clamping mechanism, and thus the number of component parts can be reduced, the cost is reduced and maintenance is made simpler.

SECOND EMBODIMENT

A second embodiment of this invention shall be described with reference to FIGS. 11–14.

Figure 11:
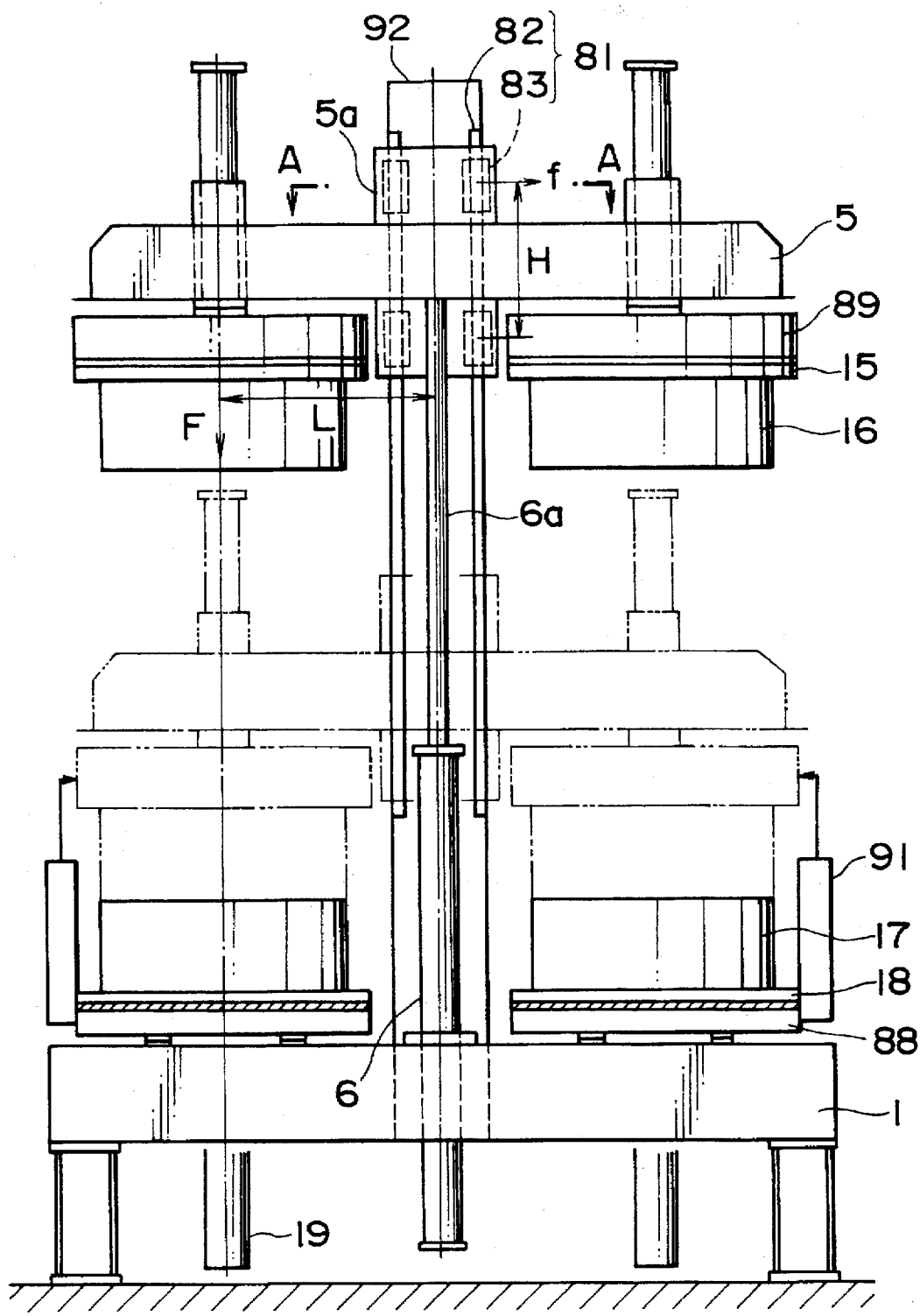
FIG. 11 is front view of a tire tire vulcanizing press according to another embodiment of the present invention.
Figure 12:
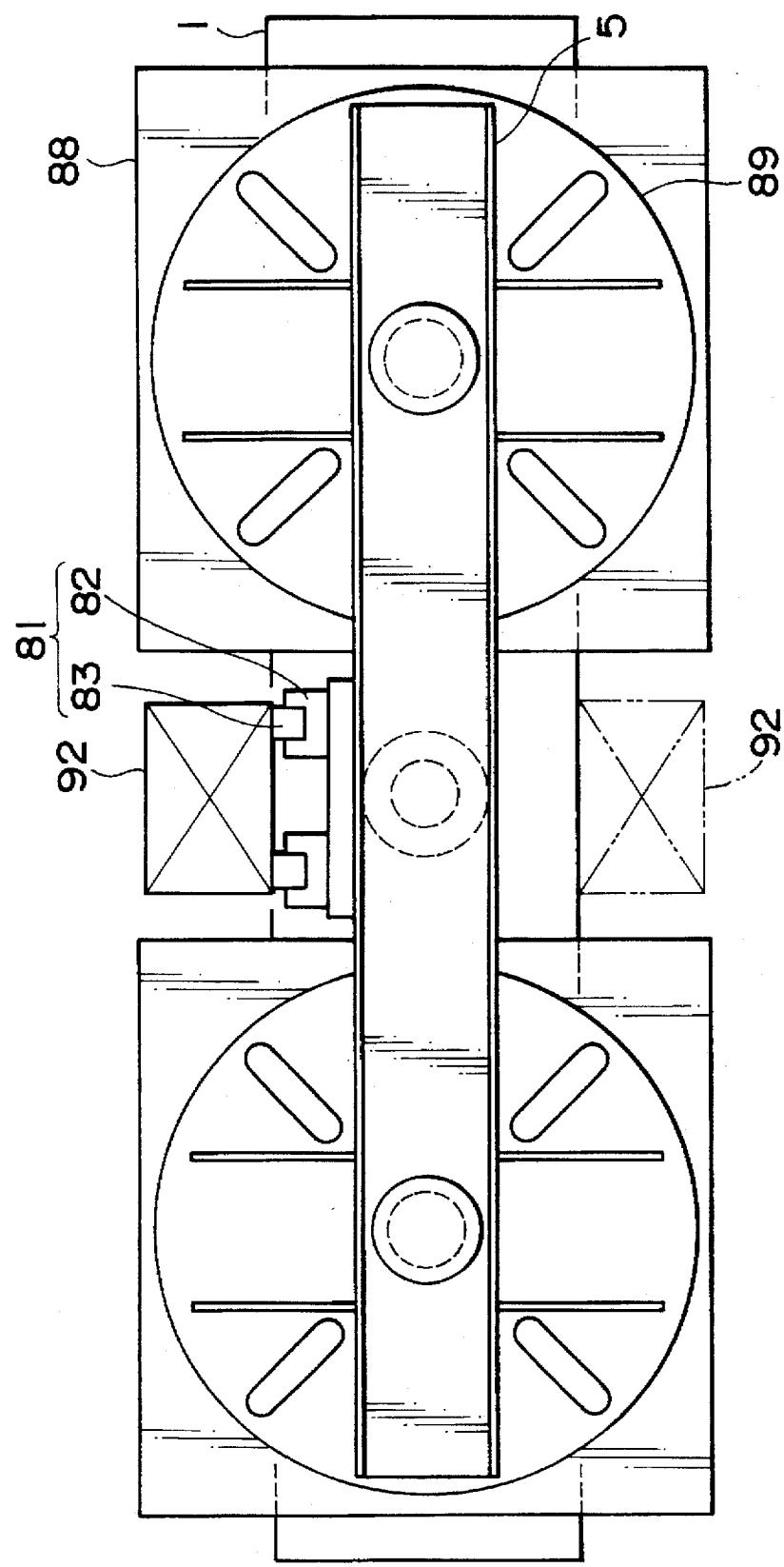
FIG. 12 is an overhead view of the tire vulcanizing press shown in FIG. 11.

With reference to FIG. 11, 1 denotes a base frame, 92 a stand frame, 5 a top frame, 17 a lower mold, 16 an upper mold, 18 a lower platen, 15 an upper platen, 89 an upper platen support, 6 a frame lifting cylinder (lifting means), and 91 a clamping mechanism for clamping the upper and lower molds.

As shown in the Figure, a pair of lower molds are supported face-upwards and in left and right positions on the base frame 1 via lower platen support 88 etc. Similarly, a pair of upper molds 16 are supported face downwards and in corresponding left and right positions on top frame 5 via upper platen supports 89.

Stand frame 92 is secured to the back side face of base frame 1 in a position between the pair of molding stations each comprising an upper 16 and a lower mold 17. Guide means 81 is provided between top frame 5 and stand frame 92. More specifically, guide means 81 is arranged such that its center is vertically in line with the center of gravity of the top frame 5, and the cylinder rod 6a of frame lifting cylinder 6 is attached to the top frame 5 at a point vertically in line with the center of gravity of the top frame such that the top frame may be lowered and raised by the contraction and extension of the cylinder rod 6a of frame lifting cylinder 6 without disturbing the balance of the top frame 5.

19 denotes the center mechanism used for inserting inside the green tire a bladder into which heating gases etc. are supplied. 92' denotes a stand frame erected as necessary for the attachment of a tire loader etc.

Figure 13:
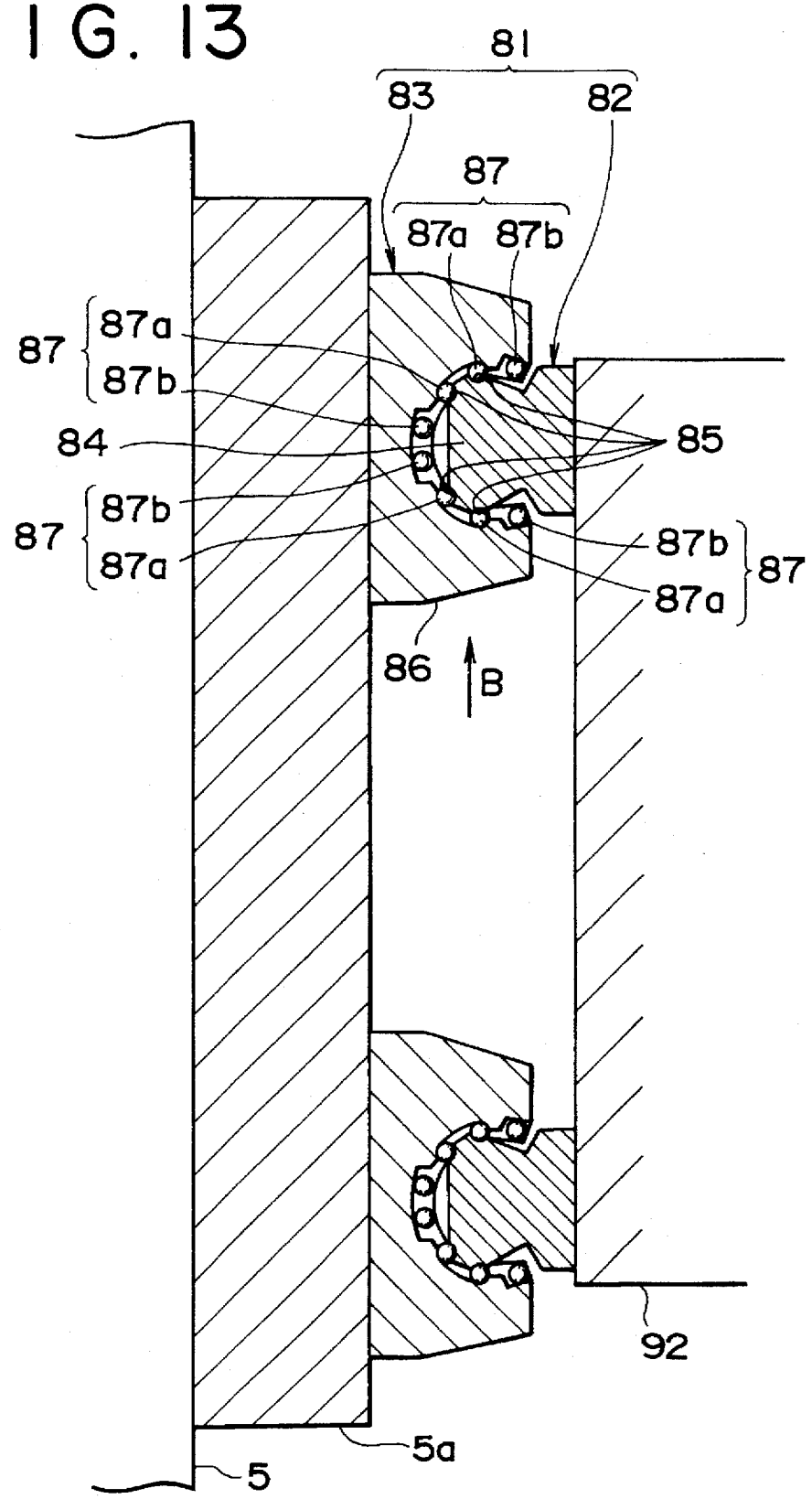
FIG. 13 is a diagram showing a cross-section taken at A—A in FIG. 11.
Figure 14:
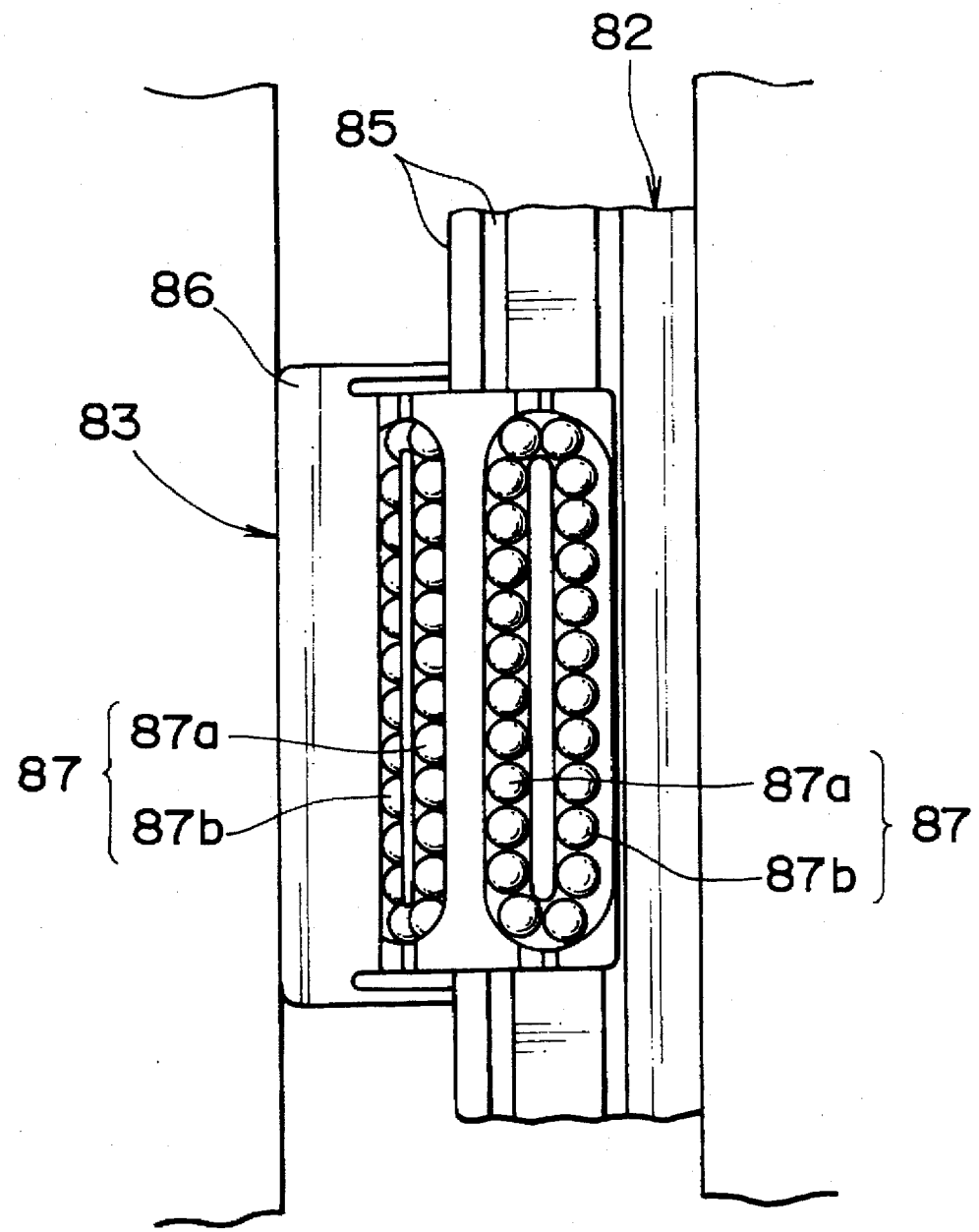
FIG. 14 is the diagram showing the view from a direction indicated by arrow B in FIG. 13.

Next, a detailed description of the guide means 81 shall be made with reference to FIGS. 13 and 14. Guide means 81 comprises a pair of rails 82 mounted on stand frame 92 to extend in a vertical direction, and a movable carriage 83 fixed to side plate 5a of top frame 5. On the shoulder portions of rails 82 are provided four grooves 85, and in the channel unit 86 of movable carriage 83 are incorporated four loops of ball trains 87 each loop having a length of "load-bearing" balls 87a and a parallelly arranged length of "relief" balls 87b. The balls can rotate in both directions, and the movable carriage 83 runs along the rails 82 through the rolling action of the length of "load bearing" balls 87a along grooves 85. The lengths of "load-bearing" balls 87a are so arranged as to surround the shoulder section 84 of the rails 82 from all four directions, and thus the movable carriage bears the load from all directions making it possible to achieve a high precision sliding action.

The guide means 81 as a whole has a high level of rigidity due to (i) the high rigidity of the receiving channel 86 of movable carriage 83 and the rails 82, and also due to (ii) the line contact achieved between the balls and channels by giving the grooves 85 of rails 82 a rounded shape of diameter similar to the diameter of the balls. Furthermore, with this guide means 81, it is possible to effect accurate linear displacement of the movable carriage 83 without any rickety action from side to side, due to the fact that the movable carriage 83 precisely fits the rail 82, and due to the fact that backlash between the channels and the ball trains is eliminated by applying a specified preload.

Next, the operation of the above-described tire vulcanizing press will be described. The top frame 5 is raised by extending the cylinder rod 6a of frame lifting cylinder 6, to thereby raise the upper mold 16. A green tire is then set into a specified position on the lower mold 17. The bladder of the center mechanism 19 is then inserted inside the tire, the bladder is inflated and shaping of the tire is effected. At the same time, the top frame 5 is lowered by contracting the cylinder rod 6a of frame lifting cylinder 6 to lower the upper mold 16 onto lower mold 17a. Then vulcanization is effected by supplying heating gases to the inside of the bladder while effecting forced clamping of the lower and upper molds 16, 17, by applying a clamping force to the upper and lower platens of each left and right mold pair separately using clamping mechanisms 91. When the vulcanization is complete, the top frame 5 is raised by extending the cylinder rod 6a of frame lifting cylinder 6. The vulcanized tire is stripped from upper mold 16, to leave the tire sitting on the lower mold 17. The vulcanizing cycle is completed by removing the vulcanized tire to a position outside the press using the tire unloader, and a new green tire is loaded onto the lower mold to start a new vulcanizing cycle.

The raising and lowering of the top frame during the above described vulcanizing cycles is effected by means of guide means 81 comprising movable carriage 83 and rails 82 located between top frame 5 and stand frame 92. Since the guide means 81 is constructed to a high precision, precise centering and parallelism can be realized during the opening and closing of the upper and lower molds 16, 17, and therefore the shaping of the green tire and the stripping from the upper mold of the vulcanized is effected accurately, to produce a finished vulcanized tire of high precision.

With this kind of twin cavity vulcanizing press, it is usual to effect twin vulcanization using both left and right sets of molds at the same time. However, there are also cases when single vulcanization is effected using one of the left and right sets of molds. In this kind of case, the pulling force generated when stripping the tire from the lower mold, and the force of reaction against the clamping action during shaping of the green tire, only acts on one of the sets of molds.

For example, if as shown in FIG. 11, a pulling force F acts on the upper mold 16, a moment (F×L) will act on guide means 81, where L is the distance to the middle point between the left and right molds. A moment (f×H) opposes this moment (F×L), where f is the force of reaction acting on one of the movable carriages 83 and H is the distance between the centers of the upper and lower movable carriages 83. As shown in the diagram, there are two rails 82 mounted on the stand frame, and ideally the load born by one of these rails is equal to (f×H)/2. Accordingly, the load in the horizontal direction on the movable carriage 83 decreases with an increase in the distance H between the upper and lower movable carriage 83, and thus it is possible to maintain a high level of lifting precision by selecting appropriately sized rails 82 and movable carriages 83, without any need to indiscriminately increase the size thereof. Furthermore, by using a pair of rails 82, a precise lifting operation can be further assured.

Furthermore, in the above-described embodiment, a mechanism located to the side of and between upper and lower platen supports 88, 89 was employed as the clamping mechanism for clamping the upper and lower molds 16, 17. However, it is also possible to apply this invention with the same effect to a dome-lock type press in which the forced clamping of the upper and lower molds is effected inside upper and lower domes which can be retractably closed together. Indeed, it is possible to use any type of clamping mechanism. Furthermore, in the above-described embodiment, a hydraulic cylinder was employed as the lifting means. However, it is also possible to use mechanical means such as linkage type means etc. Also, the hydraulic cylinder used for lifting the top frame was described as being positioned centrally between the left and right sets of molds to maintain good balance. However it is also possible to arrange the cylinder in a position offset of this center position in a range limited by the strength of the linear motion guide comprising the rails 82 and movable carriage 83.

What is claimed is:

1. A tire vulcanizing system comprising a tire vulcanizing press having a plurality of molding stations at which a green tire is molded between a displaceable mold and a fixed mold clamped together at each of said molding stations, said vulcanizing press comprising:

a fixed frame supporting said fixed molds of said stations;

a displaceable frame supporting said displaceable molds of said molding stations;

lifting means for vertically displacing said displaceable frame with respect to said fixed frame, said lifting means having a first longitudinal axis which extends between said molding stations;

connecting means having a second longitudinal axis which extends between said molding stations for connecting said fixed frame to said displaceable frame, said second longitudinal axes of said connecting means being substantially parallel to said first longitudinal axis of said lifting means, said first longitudinal axis of said lifting means and said second longitudinal axis of said connecting means being positioned in a single vertical plane which extends between said molding stations;

lock means engageable with a portion of said connecting means for securing said displaceable frame to said fixed frame via said connecting means; and clamping means for clamping said displaceable molds to said fixed molds.

2. The tire vulcanizing system according to claim 1, further comprising a tire loader for loading green tires from a position outside the tire vulcanizing press to a specified position between said fixed and displaceable molds, said tire loader comprising:

chuck means for grasping a green tire; and horizontal displacement means mounted on said displaceable frame for displacing said chuck means in a horizontal direction.

3. The tire vulcanizing system according to claim 2, wherein said horizontal displacement means is mounted on said displaceable frame for vertical displacement with respect thereto.

4. The tire vulcanizing system according to claim 1, further comprising guide means arranged between said molding stations, said guide means comprising:

a rail mounted vertically between said molding stations and having a groove formed thereon; and at least two movable carriages attached to said displaceable frame, said movable carriages having balls mounted therein which run along said groove of said rail.

5. The tire vulcanizing system according to claim 4, wherein a plurality of said rails are mounted parallel to each other.

6. The tire vulcanizing system according to claim 1, further comprising a tire loader for loading green tires from a position outside the tire vulcanizing press to a specified position between said fixed and displaceable molds, and guide means arranged between said molding stations, said tire loader comprising: chuck means for grasping a green tire; and horizontal displacement means mounted on said displaceable frame for displacing said chuck means in a horizontal direction, and said guide means comprising a rail mounted vertically and having a groove formed thereon; and at least two movable carriages attached to said displaceable frame, said movable carriages having balls mounted therein which run along said groove of said rail.

7. The tire vulcanizing system according to claims 1, 2, 4 or 6, wherein separate clamping means is provided for each molding station.

8. The tire vulcanizing system according to claim 7, wherein said clamping means comprises a hollow cylinder supported of said displaceable frame and a hollow rod slidably fitted in said hollow cylinder, said hollow rod being connected to said displaceable mold.

9. The tire vulcanizing system according to claim 7, wherein said clamping means comprises:

a mold clamping mechanism for forcibly pressing said displaceable mold towards said fixed mold; and an adjustment mechanism for adjusting a vertical position of said displaceable mold in accordance with any change in a mold height dimension accompanying a change of a mold.

10. The tire vulcanizing system according to claim 9, wherein said mold clamping mechanism and said adjustment mechanism are combined into a single unit.

11. The tire vulcanizing system according to claims 1, 2, 4 or 6, wherein said clamping means is mounted on said displaceable frame or on said fixed frame.

12. The tire vulcanizing system according to claims 1, 2, 4 or 6, further comprising a tire unloader for unloading a tire from one of said plurality of molding stations, conveying a tire to a post-cure inflator having secured tire supports, and conveying a tire from said post-cure inflator to conveyor means.

13. The tire vulcanizing system according to claim 1, wherein said portion of said connecting means defines a first end of said connecting means which is insertable through a hole formed in the center of the displaceable frame, said connecting means including a second end which is mounted to said fixed frame.

* * * * *